United States Patent [19]

Zwicky

[11] Patent Number: 4,720,665

[45] Date of Patent: Jan. 19, 1988

[54] SIGNAL TRANSDUCER

[75] Inventor: Paul Zwicky, Dielsdorf, Switzerland

[73] Assignee: Willi Studer A.G. Fabric für elektronische Apparate, Regensdorf, Switzerland

[21] Appl. No.: 914,372

[22] Filed: Oct. 2, 1986

[30] Foreign Application Priority Data

Oct. 7, 1985 [CH] Switzerland ........................ 4326/85

[51] Int. Cl.[4] ............................................ G05B 11/00

[52] U.S. Cl. .................................... 318/687; 333/217

[58] Field of Search ......................... 318/687; 333/217

[56] References Cited

U.S. PATENT DOCUMENTS 3,965,441 6/1976 Roy et al. ........................... 331/115

4,514,675 4/1985 Matumoto et al. ................ 318/696

4,554,504 11/1985 Dillon ............................... 323/356

*Primary Examiner*—William M. Shoop, Jr.

*Assistant Examiner*—Saul M. Bergmann

*Attorney, Agent, or Firm*—Helfgott & Karas

[57] ABSTRACT

A transducer for converting electrical input signals into an electrical or mechanical output. The transducer employs a circuit for producing a negative source impedance and a winding cooperating with the circuit. The winding has first and second parts connected end to end. The ratio of the induced electromotive forces developed across the first part relative to that of the second part differs from the ratio of the ohmic resistance of the first part relative to that of the second part.

9 Claims, 7 Drawing Figures

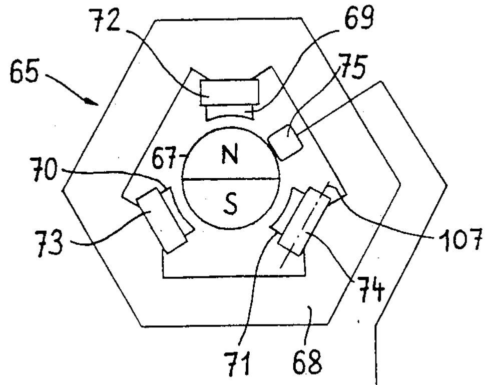
Fig. 6
Fig. 7
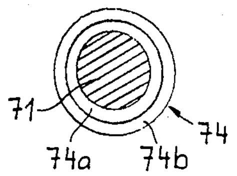
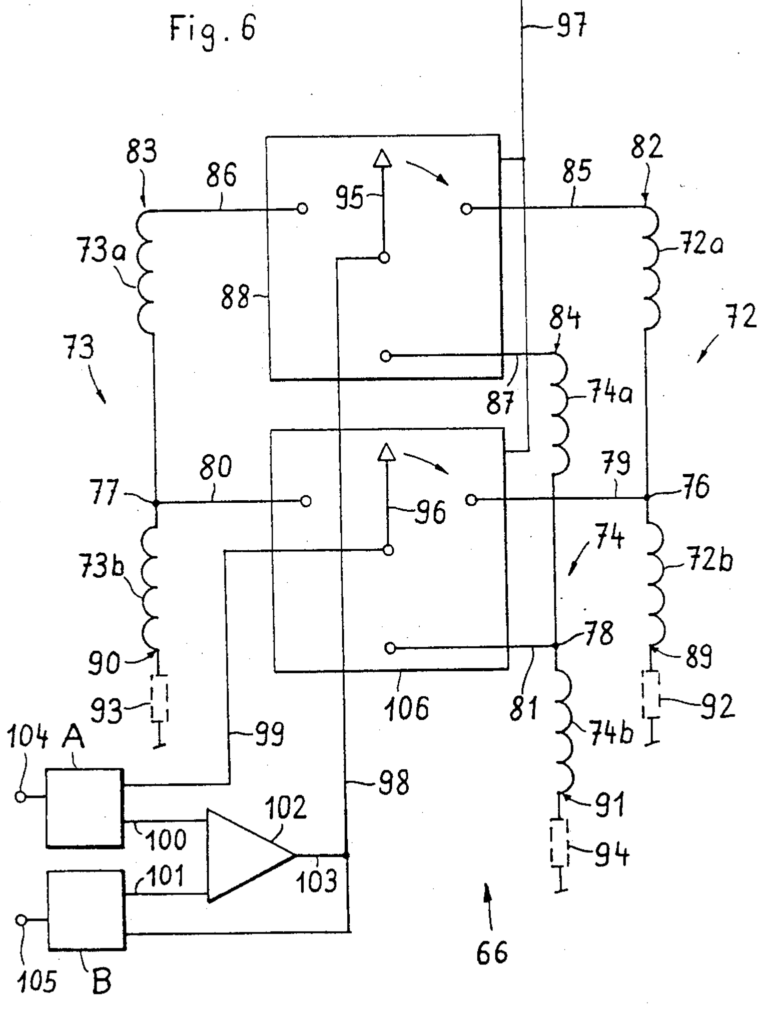

SIGNAL TRANSDUCER

BACKGROUND OF THE INVENTION

The present invention relates to a transducer or converter for converting an electric input signal into an electric signal for mechanical output and more particularly relates to a transducer or converter which utilizes a winding and a circuit connected thereto to produce a negative source impedance.

There are various typical constructions known for such transducers, depending upon the type of output desired. If the output signal is an electric signal, then the transducer typically is a transformer. The input signal, which has a specific current/voltage ratio is converted by the transformer into an output signal with a different current/voltage ratio. If the output takes mechanical form such as movement or force, then the transducer can be an electrodynamic transducer or loudspeaker, or an electric motor. In any of these cases a winding is disposed in a magnetic field and a current flowing through the winding, produced for example by the input signal, causes a movement of the winding in the magnetic field. This movement can produce as an output an oscillation or a continuous movement. In many transducer applications, it is desired or even required for the output changes to follow the input signals as closely as possible so that such transducers can have a high degree of linearity or proportionality between the input signal and the output.

For example, in the case of a loudspeaker, it is desirable for the mechanical oscillations of the diaphragm to closely, if not exactly, correspond as proportional to the oscillations of the electric input signal. If this is not the case, the loudspeaker has poor fidelity. Poor fidelity can result from the fact that the current carrying winding in the magnetic field in which it is located is subject to mechanical restoring forces which destroy or modify the actual movement thereof.

When the transducer is a transformer, it is desirable for the electric signal in the secondary winding to be as precisely proportional as possible to the signal in the primary winding. However, this is only the case if the transformer is operated in a range for which its transfer characteristic is linear. The transfer characteristic is not linear when an iron core is used, since the magnetizing current required by the iron core is not linear.

When the transducer is a direct current motor, it is known that the linearity relationship between the output (rotary signal) and input signal will be impaired by the mechanical loading.

European patent application No. 0 041 472 discloses a circuit arrangement, particularly with an electromagnetic or electromechanical transducer which employs an iron core. The signal is modified in a nonlinear manner because of the nonlinear characteristic of the core but the circuit produces signal compensation whereby the linearity is restored. For this purpose, the voltage drop in the winding resistance of the inductor is measured and is compensated for by applying an additional voltage which eliminates the effect of the voltage drop.

This additional voltage is produced across a resistor, which is connected in series with the winding (which has resistive as well as inductive parameters). However, in order to be able to fulfil its function in an optimum manner, the resistor should be made from the same material and have the same operating temperature as the winding. As a result, the resistor must be positioned as close as possible to the winding, which is often not possible. In a moving-coil loudspeaker, for example such a resistor cannot be positioned close enough to the moving-coil, because there is no space available. Consequently there are many applications in which a compensating resistor cannot be used whereby the undesired nonlinearities of the transducer cannot be eliminated.

SUMMARY OF THE INVENTION

Accordingly, it is an object of the present invention to provide means for eliminating undesired nonlinearities in transducers without using a compensation resistor.

Another object of the present invention is to provide a transducer wherein accurate compensation of signal distortions are produced in a winding by providing precise control of the electromotive force transferred to the winding.

Yet another object of the present invention is to provide a transducer wherein the nonlinearities otherwise present are substantially eliminated by employing a circuit producing a negative impedance source in combination with a two part winding.

Yet a further object of the present invention is to provide a new type of transducer employing a two part winding wherein the ratio of the induced electromotive force across the first part of the winding relative to that of the second part of the winding differs from the ratio of the ohmic resistance of the first part relative to that of the second part.

In accordance with the principles of the invention a transducer responds to an electrical input signal to produce an electrical or mechanical output with a high degree of linearity. To this end, a negative source impedance is developed to compensate for the nonlinear effect which would otherwise be produced. This impedance is developed with the use of a winding having first and second winding parts which are interconnected end to end in series. This winding is so constructed that the ratio of the induced electromotive force developed across the first part of the winding to that across the second part of the winding does not correspond to the ratio of the ohmic resistance of the first part of the winding to that of the second part of the winding. Normally, the induced electromotive forces developed across the two parts are identical.

These and other objects, features and advantages of the invention will, in part, be pointed out with particularity, and will, in part, become obvious from the following more detailed description of the invention taken in conjunction with the accompanying drawings which form an integral part thereof.

DESCRIPTION OF THE DRAWINGS

In the drawings:

FIG. 6 shows a direct current motor as a transducer utilizing a negative source impedance in accordance with the invention; and FIG. 7 is a cross sectional view of part of the structure shown in FIG. 6.

DETAILED DESCRIPTION OF THE PREFERRED EMBODMIENTS

Figure 1:
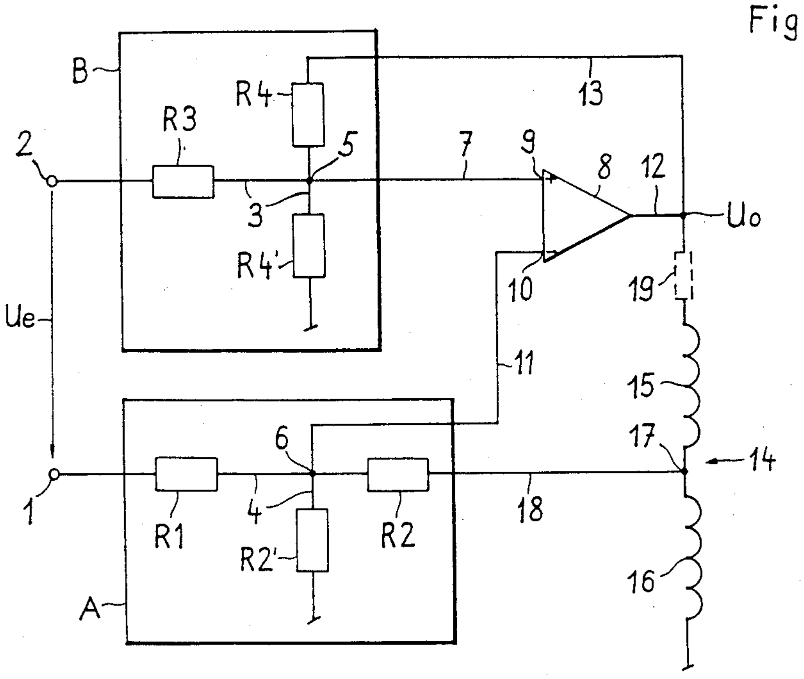
FIG. 1 shows a circuit for controlling an electromechanical transducer with a negative source impedance.

FIG. 1 shows a circuit for controlling an electromechanical transducer with a negative source impedance. An input voltage Ue is applied between input terminals 1 and 2. Terminal 1 is connected through resistor R1, line 4, and resistor R2' to ground. Terminal 2 is connected through resistor R3, line 3, and resistor R4' to ground. The junction 5 between resistors R3 and R4' is connected via a line 7 to a non-inverting input 9 of an operational amplifier 8. The junction 6 between resistors R1 and R2' is connected via a line 11 to the inverting input 10 of operational amplifier 8. The output 12 of the operational amplifier 8 is connected via a line 13 and a resistor R4 to junction 5 and is also connected to one end of a first part of winding section 15 of winding 14. A second part or winding section 16 of winding 14 is connected between the other end of section 15 and ground. These two sections have a common tap 17 which is connected via line 18 and resistor R2 to the junction 6. An output voltage Uo appears between the output 12 of amplifier 8. Resistor R4 and lines 7 and 13 form a regenerative feedback loop for the non-inverting input of the amplifier. Resistor R2 together with lines 18 and 11 form a negative feedback loop for the inverting input of the amplifier.

The section 15 has a higher ohmic resistance than section 16, the difference in resistance being shown symbolically as an equivalent resistor 19 connected between output 12 of the amplifier and section 15.

Resistors R1, R2, R2' and lines 4, 11, and 18, form a resistance network A. Resistors R3, R4, R4' and lines 3, 7 and 13 form a resistance network B. Winding 14 can be a moving coil of a moving coil loudspeaker or a coil of an armature of a direct current motor.

The function of the circuit for producing a negative source impedance together with a transducer shown in FIG. 1 is as follows. The conditions in no-load operation will be described first. It is assumed that a sinusoidal input signal Ue is applied between the terminals 1 and 2. This input voltage Ue is applied to the resistance networks A and B and at output 12 of operational amplifier 8 produces a sinusoidal voltage Uo. Voltage Uo is positively influenced by the regenerative feedback 13, R4, 5, 7 and negatively influenced by the degenerative feedback 19, 15, 17, 18, R2, R6, 11. The relative values of resistors R4 and R2 determine which effect preponderates. As substantially no current flows in the circuit, winding 14 only produces a weak electric field. Such a no-load operation is possible for example, where the transducer comprises a d.c. motor, which can then produce no torque. However, if the transducer is a moving-coil loudspeaker, the magnetic field in which the moving-coil and therefore winding 14 is disposed, is switched off.

If the winding is loaded, more current flows in the winding 14 and the voltage drop via the latter rises. In the case of the current according to FIG. 1, this means that the voltage at tap 17 drops, because the ohmic resistance between output 12 and tap is greater then between tap 17 and earth. This is because the first part 15 of winding 14 has a resistance which is higher as indicated by the equivalent resistor 19 than the resistance of the second part 16. Thus, as the resistance in the negative feedback rises, there is also a rise in the voltage between inputs 9, 10 of operational amplifier 8, so that the latter increases its gain.

As a result of the inventive arrangement and design of winding 14, the ratio of ohmic resistances in the two parts 15, 16 does not correspond to the ratio of the induced electro-motive force in parts 15 and 16 (normally this ratio is unity). The current flowing through winding 14 is measured. This is proportional to the voltage drop across the equivalent resistor 19. However, the equivalent resistor 19 is not incorporated as such, but e.g. results from the fact that the cross-section of wire forming part 15 differs from the cross-section of the wire which forms part 16 of winding 14, although both parts have the same number of turns. Another possibility is to make the length of the wire for one turn of one part of winding 14 longer than that for the other part of winding 14. This can be achieved by the arrangements of winding 14, as described in more detail in FIGS. 4 and 5. However, the equivalent resistor 19 can also be obtained by turn, whose materials have a different electrical conductivity for each of the two parts 15, 16 of winding 14.

Figure 2:
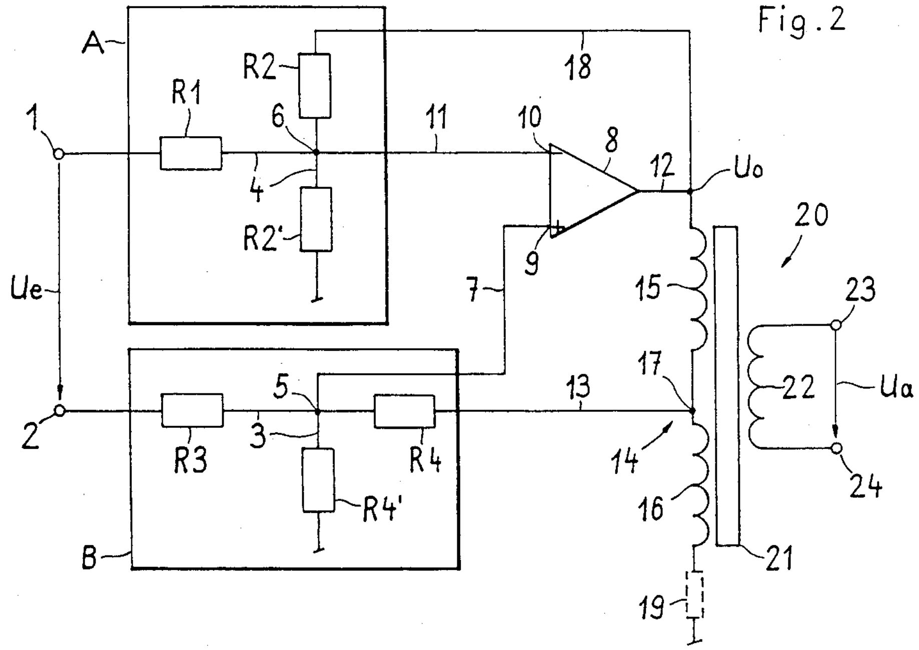
FIG. 2 shows a circuit for controlling an electromagnetic transducer with a negative source impedance.

FIG. 2 shows a transducer 20 connected to a circuit for the control thereof with a negative source impedance similar to FIG. 1. This also has terminals 1 and 2, between which there is an input voltage Ue, but with reverse polarity. With the terminal 1 are also associated resistors R1, R2, R2' and lines 4, 11, 18, which are however, connected to the inverting input 10 of operational amplifier 8. Together they form the resistance network A. With terminal 2 are also associated resistors R3, R4, R4' and lines 3, 7 and 13, but they are connected to the non-inverting input 8 of operational amplifier 8. Together they form a resistance network B. The first part 15 of winding 14 is on the one hand connected to output 12 of operational amplifier 8 and on the other hand via tap 17 to line 13. The second part 16 is located between tap 17 and ground. The equivalent resistor 19 is so positioned as to show that the second part 16 of the winding 14 has a greater ohmic resistance than the first part. The equivalent resistor 19 is also connected to ground. In this example, winding 14 can be considered as a primary winding transducer that is transformer 20, particularly as the primary winding. Transformer 20 has a secondary winding 22. All windings have connections 23, 24 between which there is an output voltage Ua. Thus, this transformer 20 is in a position to convert an input voltage Ue into an output voltage Ua.

The description of the function of the circuit of FIG. 1 applies to the circuit of FIG. 2 except, however since the transducer is a transformer 20, the secondary winding 22 does not produce a magnetic field under no load operating conditions, because no current is flowing. Primary winding 14 is then also unloaded. Under load conditions loading of the winding 14 causes the voltage between tap 17 and ground to rise because the ohmic resistance between ground and tap is greater than the resistance between tap 17 and output 12. In this construction the second part 16 of winding 14 has a resistance which is higher than that of the first part as indicated by the equivalent resistor 19. Since the resistance in the regenerative feedback loop drops, the voltage between inputs 9 and 10 of operational amplifier 8 rises, so that the latter increases its gain. The circuit responds to a load current increase to cause rise of the terminal voltage Uo at output 12, corresponding to the negative source impedance.

Figure 3:
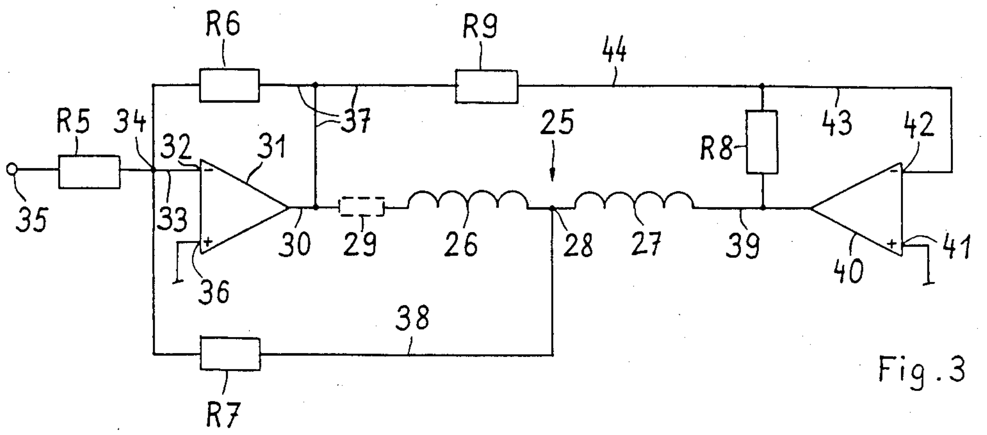
FIG. 3 shows another circuit for controlling a transducer with a negative impedance.

FIG. 3 shows another construction of a circuit for producing a negative source impedance with a transducer and correspondingly with a winding 25 having a first part 26 and a second part 27. The two parts 26 and 27 are interconnected via a tap 28. An equivalent resistor 29 is associated with the first part 26. The latter is connected to an output 30 of a first operational amplifier 31, which has an inverting input 32, which is connected via a line 33, a junction 34 and a resistor R5 to an input 35. The non-inverting input 36 of operational amplifier 31 is grounded. A resistor R6 is connected via line 37 to output 30 of amplifier 31 and is also connected via junction 34 to inverting input 32 to form a feedback loop. Further feedback to inverting input 32 is applied via tap 28, resistor R7 and line 38. The second part 27 of winding 25 is connected to an output 39 of a second operational amplifier 40, whose non-inverting input 41 is grounded. The inverting input 42 is connected via a line 43 and a resistor R8 to output 39 to provide a negative feedback loop. Line 43 is connected to line 44 which is connected through resistor R9 and line 37 to the output 30 of amplifier 31 and also via lines 37 and resistor 6 to inverting input 32. Thus, the inverting inputs 32 and 42 are interconnected across resistors R6 and R9, together with lines 37 and 44. This arrangement corresponds to a push-pull output stage for a moving-coil loudspeaker.

The circuit according to FIG. 3 has a push-pull output stage for a loudspeaker, winding 25 forming the moving coil. At outputs 30, oppositely directed voltages, which have identical values appear between output 30 and ground and between output 39 and ground. Thus, in known manner, an equivalent resistor 29 is associated with part 26 for measuring the current in winding 25. However, parts 26, 27 of winding 15 do not have the same resistances. Due to the negative feedback R7, 38 on input 32 of the first operational amplifier 31, the gain of the latter is so modified compared with the gain of the second operational amplifier 40, that the voltage zero again appears and is maintained at tap 28.

Figure 4:
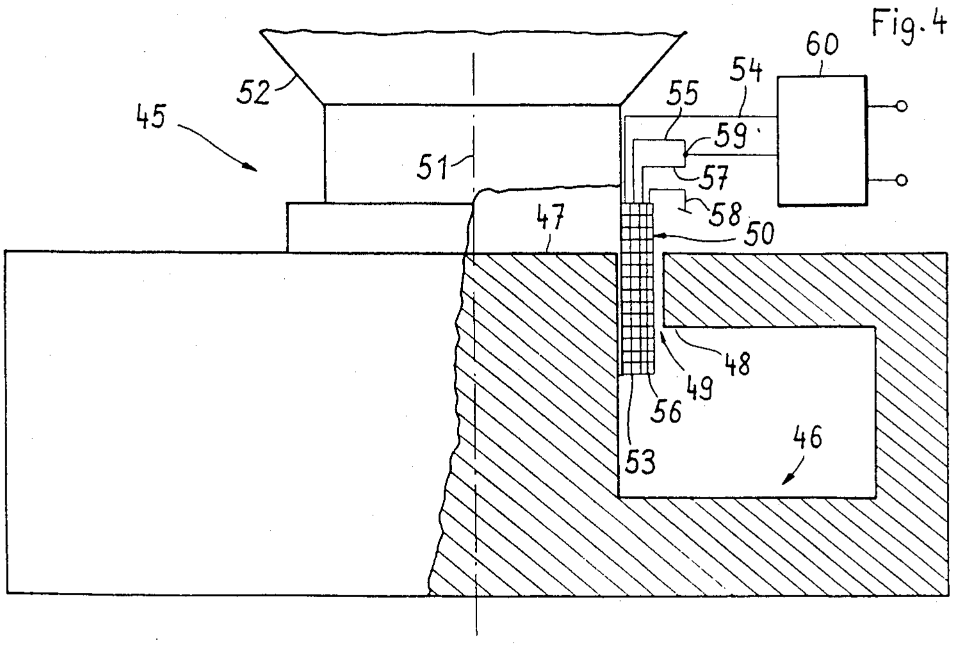
FIG. 4 is a view in section of a transducer in accordance with the invention which takes the form of a moving core loudspeaker.

FIG. 4 shows a transducer constructed as a moving coil loudspeaker 45. A magnetic circuit 46 has pole pieces 47, 48 which produce a magnetic field 49 therebetween. A moving coil 50 (as winding 14) is positioned movably in the field 49, and is parallel to an axis 51 of the transducer. In per se known manner, the core is connected to a movable diaphragm 52. The moving coil 50 is subdivided into a first part 53 with connections 54, 55 and a second part 56 with connections 57, 58. Connections 55 and 57 meet in a tap 59 and connection 54 is connected to a circuit 60 for producing a negative source impedance. In this arrangement the turns of the first part 53 of moving-coil 50 have a smaller diameter than the turns of the second part 56. In addition, the turns of the second part 56 have a smaller wire cross-section than the turns of the first part 53. Although parts 53 and 56 have the same number of turns, and thus the reaction of their inductances is unity, the ohmic resistance in the two parts 53, 56 differs.

Figure 5:
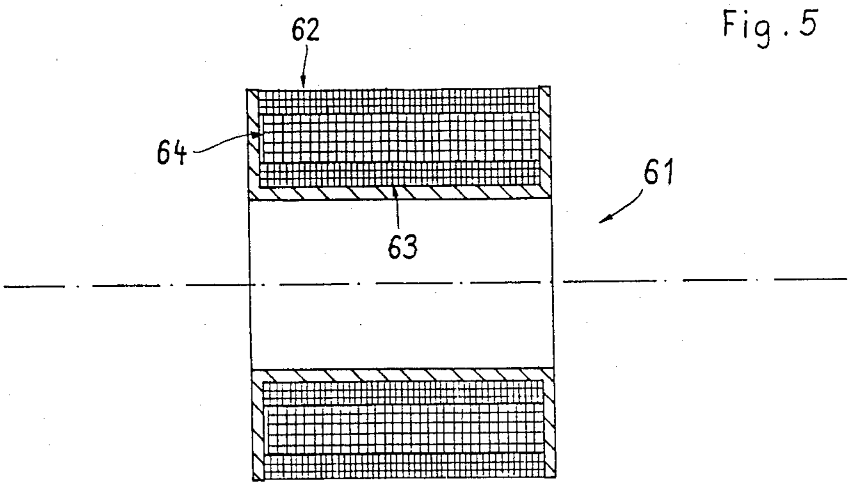
FIG. 5 is a view in section of a transducer in accordance with the invention which takes the form of a transformer.

FIG. 5 shows a rotationally symmetrically constructed winding of a transformer 61 with primary windings 62, 63 and a second winding 64 between then. This arrangement also ensures that the ohmic resistance in primary windings 62, 63 is not identical, but that the electromotive force or magnetic induction produced by each primary windings 62, 63, when a current flows through them, is of the same magnitude.

In FIG. 6 a direct current motor 65 is shown in simplified form as the transducer and to it is connected a circuit for producing a negative source impedance 66. The d.c. motor 65 has a rotor 67 having at least one permanent magnetic north pole N and south pole S. Rotor 67 is rotatably mounted in a stator 68 in per se known manner and is consequently not shown in detail here. The stator has three poles 69, 70, 71 with windings 72, 73 and 74. A commutating sensor 75 is positioned in the vicinity of rotor 67. Windings 72, 73, 74 are again diagrammatically shown in circuit 66. According to the invention, each of these windings have two parts **72*a* and 72*b*, 73*a* and 73*b*, and 74*a* and 74*b*, which are in each case separated from one another by a corresponding one of taps 76, 77, 78. These taps are connected by corresponding ones of lines 79, 80, 81 to a changeover switch 106. One end 82, 83, 84 of each of windings 72, 73, 74 is connected via a corresponding one of lines 85, 86, 87, to an additional changeover switch 88. The other end 89, 90, 91 of each of these windings is connected via a corresponding one of equivalent resistors 92, 93, 94 to ground. Each of the switches 106, 88 has a corresponding rotary switching element 95, 96, which in periodic manner makes contact and breaks contact with lines 85, 86, 87 (for element 95) or 79, 80, 81 (for element 96). The movement of the rotatory switching elements 95, 96 is controlled by the commutating sensor 75 in per se known manner, the control instructions being transmitted via a line 97. Switching elements 95, 96 are connected electrically across lines 98, 99 to in each case one resistance network A, B which are further connected across lines 100, 101 to the operational amplifier 102 whose output 103 is also connected to line 98. Each of the resistance networks A, B has an input 104, 105**.

The operation of circuit 66 corresponds to that of FIG. 2, with the sole difference that as a function of the position of rotor 67, switching elements 95, 96 connected lines 98, 99 to windings 72, 73 or 74.

FIG. 7 is a sectional along line 107 through pole 71 and winding 74, whereby the two parts **74*a*, 74*b* are shown. Part 74*b* has a larger wire length per turn, which gives a higher ohmic resistance. This is indicated in FIG. 6 by the equivalent resistor 94. The two parts 74*a*, 74*b***, have the same number of turns.

There has been disclosed heretofore the best embodiment of the invention presently contemplated. However, it is to be understood that various changes and modifications may be made thereto without departing from the spirit of the invention.

I claim:

1. A transducer for converting an electric input signal into an electric or mechanical output, said transducer being provided with means for producing a negative source impedance and a single magnetic circuit including a winding and cooperating with said means, said winding having first and second winding parts connected in series end to end and also having a tap connected to the junction of the two parts, said means being connected to said tap, the ratio of the induced electromotive force developed across the first part to the induced electromotive force developed across the second part differing from the ratio of the ohmic resistance of the first part to the ohmic resistance of the second part.

2. A transducer according to claim 1, wherein the two parts of the winding have wire turns, the turns of one of the two parts having as greater curve lengths than the turns of the other part.

3. A transducer according to claim 1, wherein the two parts have turns made from wire whose cross-sectional area for the turns of the first part differs from the cross-sectional area for the turns of the second part.

4. A transducer according to claim 1, wherein said winding constitutes the moving coil of a loudspeaker.

5. A transducer according to claim 1, wherein said winding constitutes the primary winding of a transformer.

6. A transducer according to claim 1, wherein said winding is a winding of a direct current motor.

7. A transducer according to claim 1, wherein said winding constitutes the center tapped winding of a push-pull circuit.

8. A transducer according to claim 1, wherein the first part has turns having a first electrical conductivity and said second part has turns having a second and different electrical conductivity.

9. The combination of a transducer for converting an electrical input signal into an electric or mechanical output and a circuit for producing a negative source impedance and including a first input for said electrical input signal and a second input, said transducer comprising a magnetic circuit including a winding, said winding having first and second winding parts connected in series end to end and having a tap connected to the junction of the first and second parts, said tap being connected to the second input of the circuit, the first and second winding parts being arranged in a manner at which the ratio of the induced electromotive force across the first part to that of the induced electromotive force across the second part differs from the ratio of the ohmic resistance of the first part to the ohmic resistance of the second part.

* * * * *